Dec. 31, 1935.  G. T. SOUTHGATE  2,025,785
PROCESS OF AND APPARATUS FOR WELDING
Filed Oct. 29, 1932  7 Sheets-Sheet 1

INVENTOR
GEORGE T. SOUTHGATE
BY
*E. L. Greenewald*
ATTORNEY

Dec. 31, 1935.  G. T. SOUTHGATE  2,025,785
PROCESS OF AND APPARATUS FOR WELDING
Filed Oct. 29, 1932  7 Sheets-Sheet 2
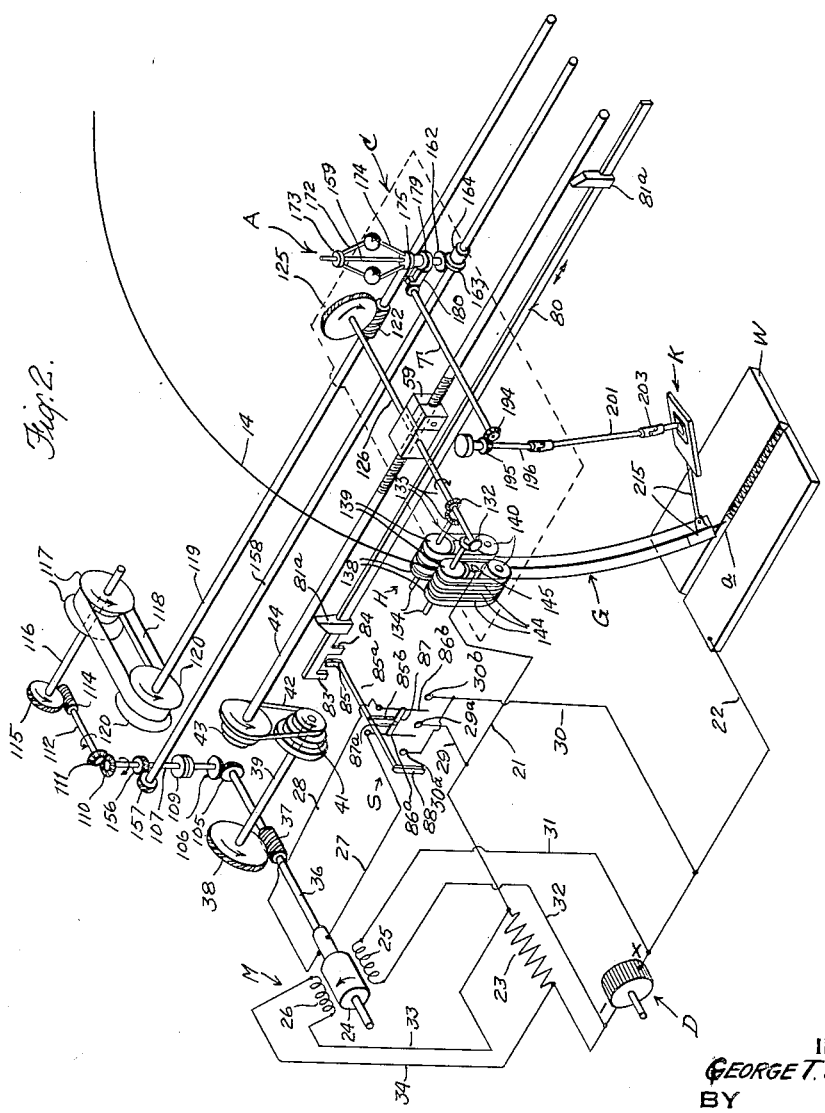
INVENTOR
GEORGE T. SOUTHGATE
BY
*Ed Greenewald*
ATTORNEY

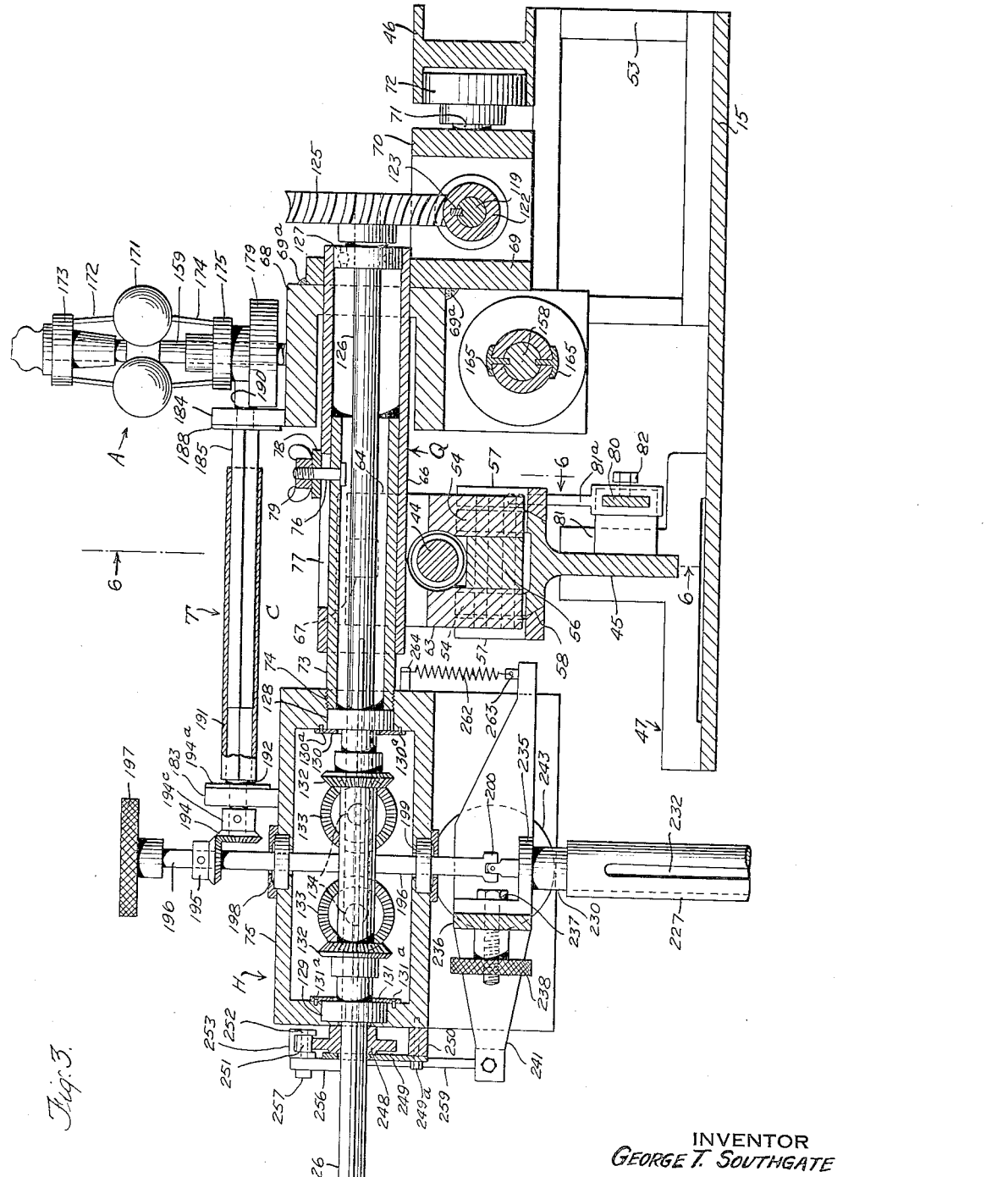

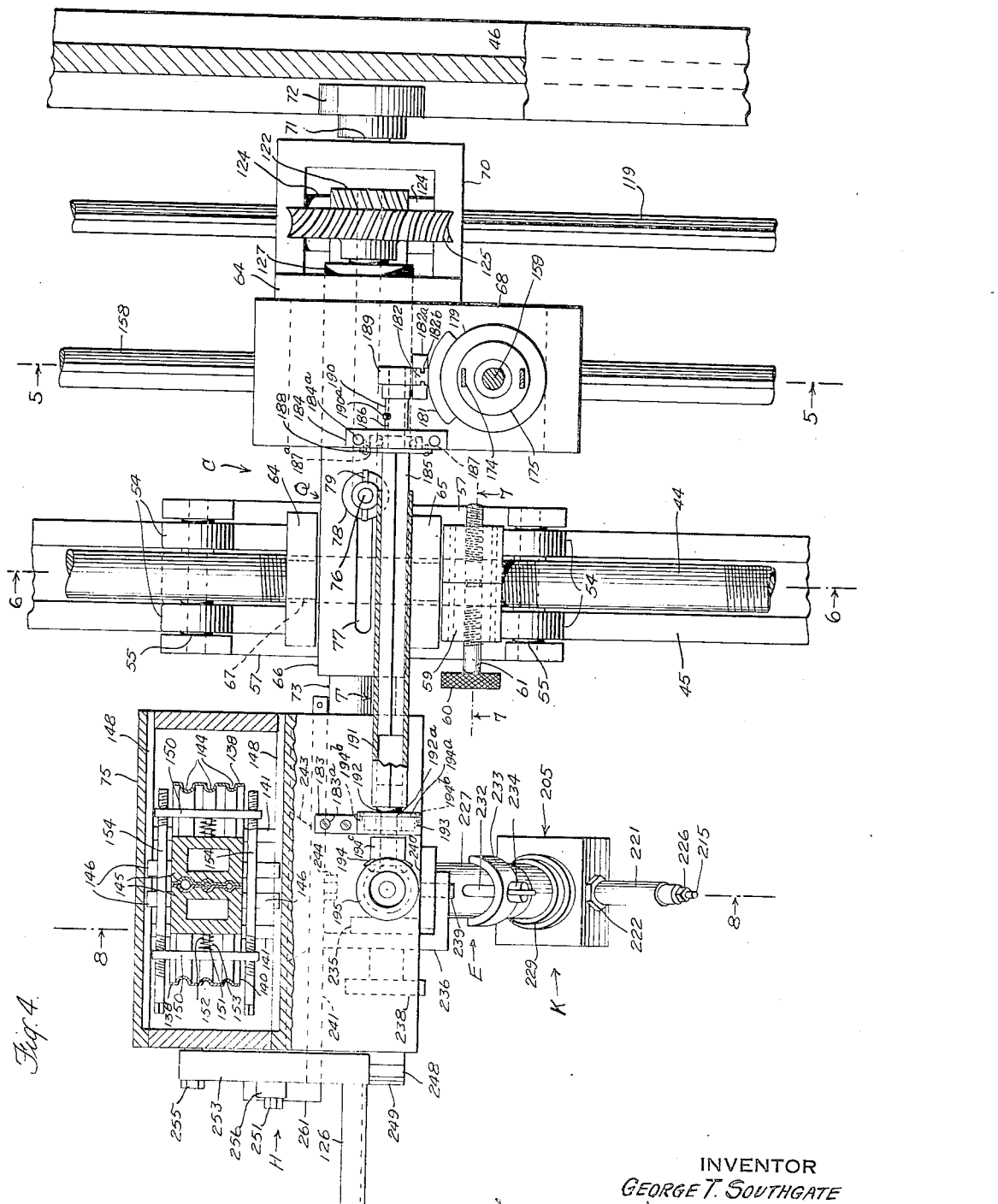

Dec. 31, 1935.   G. T. SOUTHGATE   2,025,785
PROCESS OF AND APPARATUS FOR WELDING
Filed Oct. 29, 1932   7 Sheets-Sheet 5
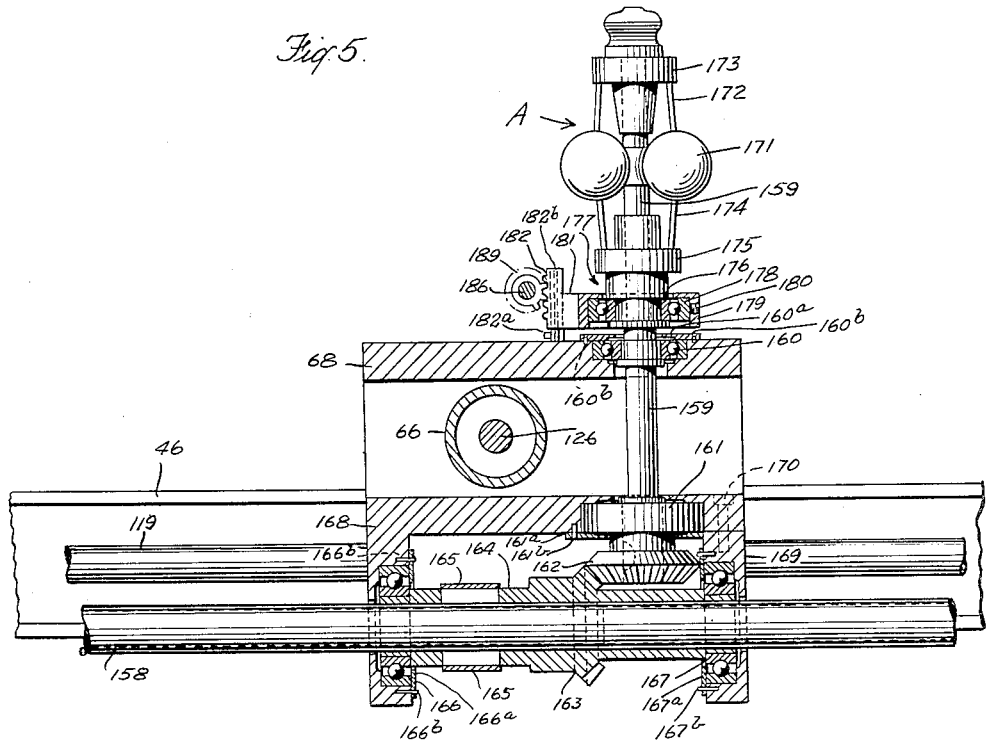
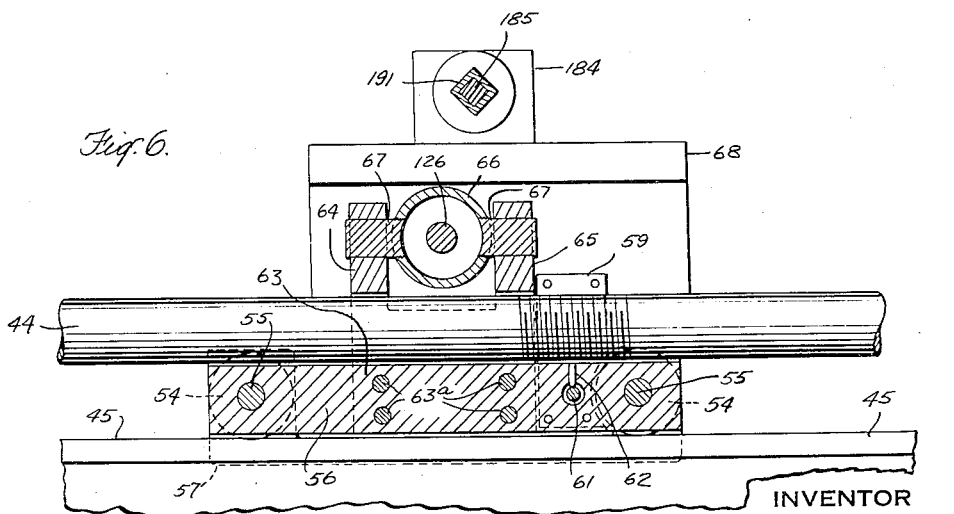
INVENTOR
GEORGE T. SOUTHGATE
BY
ATTORNEY Dec. 31, 1935.   G. T. SOUTHGATE   2,025,785
PROCESS OF AND APPARATUS FOR WELDING
Filed Oct. 29, 1932   7 Sheets-Sheet 6
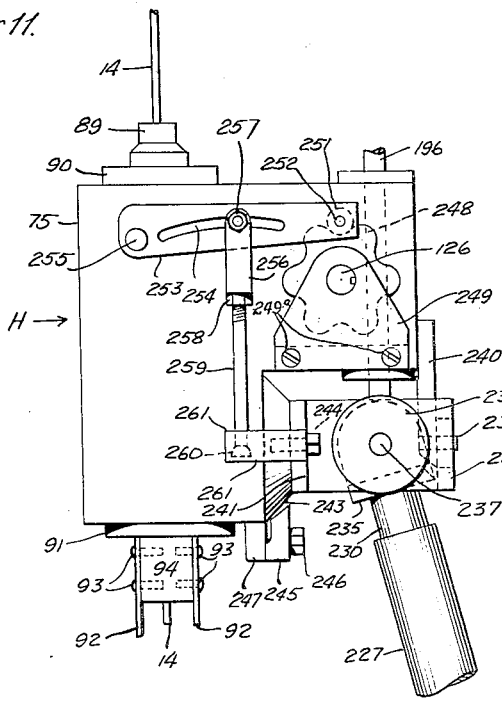
Fig. 11.
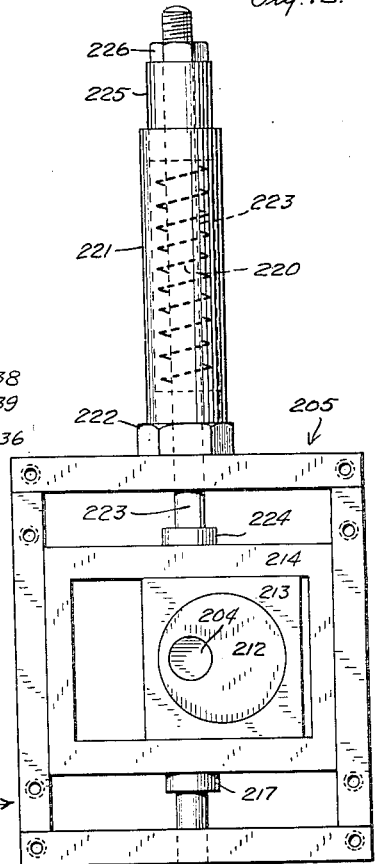
Fig. 12.
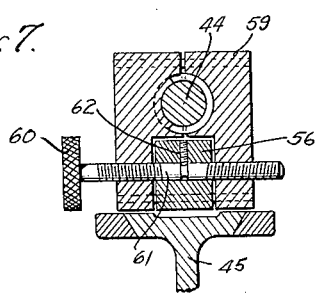
Fig. 7.
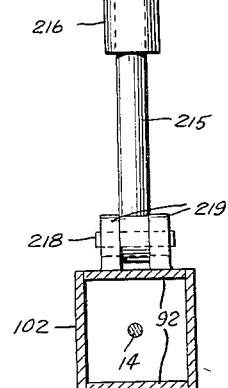
INVENTOR
GEORGE T. SOUTHGATE.
BY
ATTORNEY

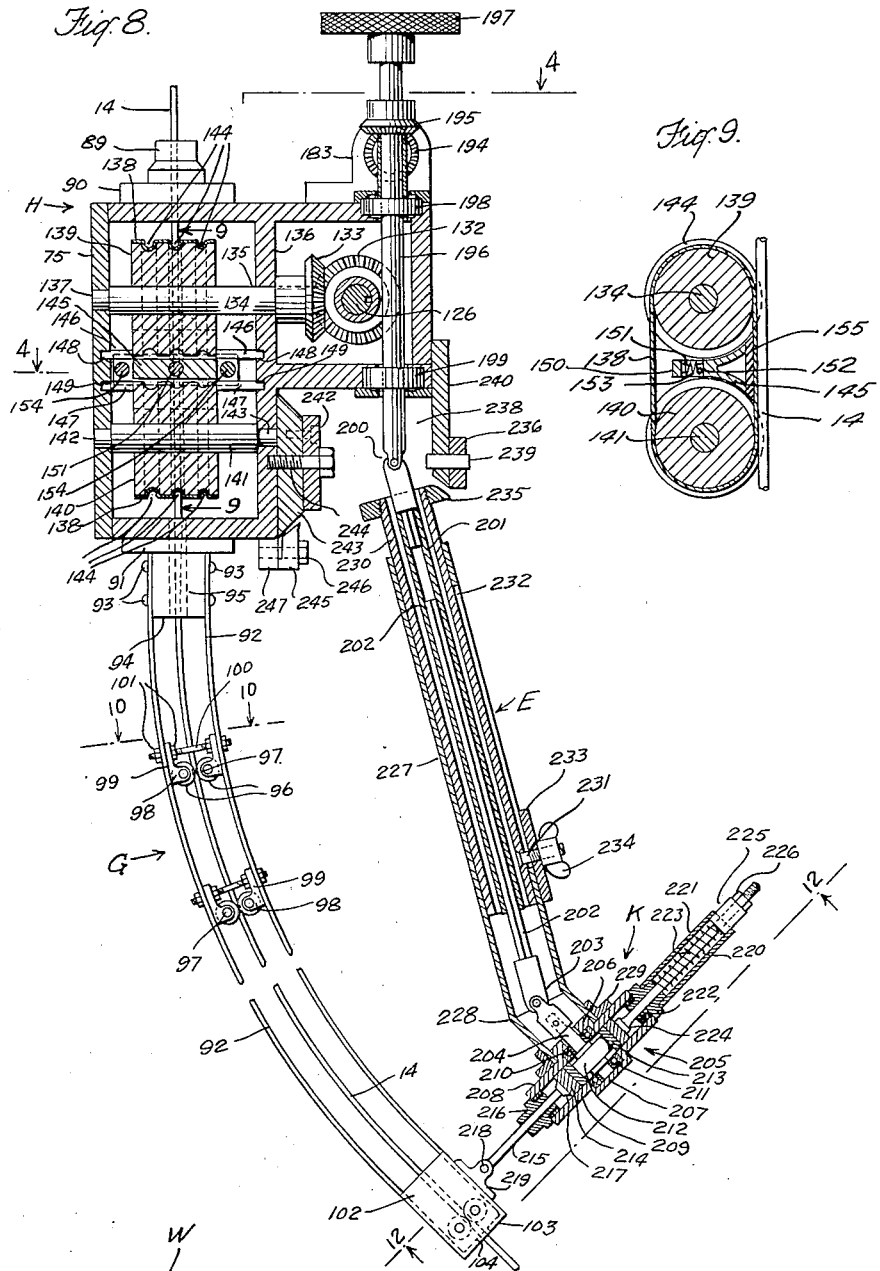

Patented Dec. 31, 1935

2,025,785

UNITED STATES PATENT OFFICE 2,025,785

PROCESS OF AND APPARATUS FOR WELDING

George T. Southgate, Forest Hills, N. Y., assignor to Union Carbide and Carbon Research Laboratories, Inc., a corporation of New York Application October 29, 1932, Serial No. 640,159

56 Claims. (Cl. 219—8)

My invention relates to a process of and apparatus for welding, and more particularly to an improved process of and machine for welding continuously and automatically. The invention is broadly applicable to both metallic arc welding in which one electrode is a welding wire or rod which is consumed by its fusion at the arc and deposited upon another electrode or the work to be welded, and to carbon arc welding in which a carbon rod constitutes one electrode and the work the other electrode. Many of the features of this invention, however, may also be found applicable to other types of welding apparatus.

The three variable factors in automatic arc welding are the length of the arc, the rate of feeding of a welding wire to the arc, and the rate of travel of the arc relative to the work. In order to produce a strong weld of uniform quality, it is essential that these three variable factors be controlled and regulated in such a manner that the work is evenly heated along the line of weld, and that a uniform deposit of metal is obtained on the work. For this reason, it is important that the length of the arc be maintained substantially constant, or of a length dependent upon the magnitude of an electrical characteristic of the arc, such as the voltage or current, so that a uniform heating is obtained along the line of weld; and that the rate of feeding of the welding wire be proportional to the rate of travel of arc relative to the work, so that a uniform deposit of metal is obtained on the work.

In arc welding apparatus, it has been the practice to regulate the length of the arc by varying the rate of feeding of the welding wire to the arc. This method of regulating the length of the arc is objectionable, because the varying of the feeding rate of the wire in accordance with an electrical characteristic of the arc will not always maintain the desired relationship of the variable factors of welding mentioned above. This is particularly true as regards the instantaneous regulation of the arc length when irregularities are encountered in a welding operation, such, for example, as variations of the height of the work or the height of the arcing puddle in the work, because the average rate of wire feeding may not always maintain its proper relationship with the heat of the arc and the rate of consumption of the wire. Moreover, there is a time lag between the time the rate of wire feeding should be changed, due to a change of a characteristic of the arc, and the time when the wire feed rate has changed to meet the new arc condition.

It has also been the practice heretofore to employ several devices to control the different variable factors of welding. In many cases these devices have been of the electromagnetic type. The electromagnetic devices have not been entirely satisfactory, especially for moving the end of the welding wire to and from the work. This is particularly true in welding apparatus where it is desirable to utilize a high force sufficient to overcome quickly the inertia of the parts, and to insure that the stiffness of the welding wire will not tend to resist the moving of the welding wire to adjust the length of the arc.

The principal object of my invention is to provide an automatic and continuous welding machine which will be reliable and sensitive in operation, and which will not readily get out of adjustment, so that a strong weld of uniform quality is produced.

A further object of my invention is to provide an improved process of and apparatus for simultaneously controlling the rate of feeding of a welding wire to the work and regulating the position of the fusing end of the welding wire.

A further object of my invention is to provide a single device responsive to one or more characteristics of the arc or condition of the weld for controlling and actuating the different variable factors of automatic welding.

A further object of my invention is to provide a welding apparatus having a mechanical device such as a centrifugal governor capable of producing a considerable force for accurately regulating the position of the fusing end of a welding wire or electrode, whereby the inertia of the parts of the welding apparatus is readily overcome.

A further object of my invention is to provide a welding apparatus in which a single electric motor responsive to a characteristic of the arc is arranged simultaneously to actuate the striking and stabilizing of the arc and the feeding of the welding wire to the arc, whereby the starting and the operation of the apparatus is insured and facilitated.

A further object of my invention is to provide a welding apparatus having a cumulative compound electric motor for actuating an electrode, the speed of which varies with the slightest change in current and voltage of the arc.

A further object of my invention is to provide a welding apparatus having gearing and mechanical connections positively driven by a single electric motor responsive to an electrical characteristic of the arc or condition of the weld for insuring an immediate regulation of the variable factors of welding, whereby a weld of uniform quality is rapidly produced.

A further object of my invention is to provide a welding apparatus in which the rate of wire feeding may be changed during the operation of the apparatus and independently of the feeding mechanism.

A further object of my invention is to provide a welding apparatus in which a welding wire is effectively gripped and fed to the arc between two belts which are pressed together at their coacting surfaces.

A further object of my invention is to provide a welding apparatus having an improved flexible guide for guiding a welding wire from a wire feeding mechanism to the work.

A further object of my invention is to provide a welding apparatus having means for imparting to a welding wire guide means an oscillatory motion transverse to the travel of the arc, whereby a uniform deposit of metal is insured across the line of weld.

The above and further objects and the novel features of my invention will become apparent from the following description and the accompanying drawings, in which Fig. 1 is a perspective view of an apparatus embodying this invention and operable in accordance with the principles thereof;

Fig. 2 is a perspective view of a portion of the apparatus illustrated in Fig. 1, diagrammatically showing the electrical connections, the gear connections with the gear casings in Fig. 1 removed, and the driving mechanism for operating the apparatus;

Fig. 3 is a vertical section of the carriage and other elements of the apparatus, taken on line 3—3 of Fig. 1;

Fig. 4 is a plan view of the carriage, partly broken away, with the welding head partly in section and taken on line 4—4 of Fig. 8, to illustrate the details of the feeding mechanism more clearly;

Fig. 5 is a vertical section taken on line 5—5 of Fig. 4, illustrating details of the mechanism for regulating the length of the arc;

Fig. 6 is a vertical section taken on line 6—6 of Figs. 3 and 4, illustrating details of the carriage and mechanism for moving the same relative to the work;

Fig. 7 is a section taken on line 7—7 of Fig. 4, showing a split nut for engaging and disengaging the carriage from a threaded lead screw;

Fig. 8 is a sectional view taken on line 8—8 of Fig. 4, illustrating details of the feeding mechanism and mechanism for moving the discharge end of a flexible welding wire guide to and from the work;

Fig. 9 is a section taken on line 9—9 of Fig. 8, illustrating details of the feeding mechanism;

Fig. 11 is a side elevation of the welding head, showing details of the welding wire oscillating mechanism; and Fig. 12 is a view, partly in section, taken on line 12—12 of Fig. 8, with the side plate of the arc-regulating head housing removed, showing details of the arc regulating mechanism.

In accordance with my invention the proper relationship of the variable factors of arc welding is maintained by employing a single cumulative compound electric motor, which is responsive to conditions in the welding circuit, for simultaneously regulating the rate of travel of the arc relative to the work, the rate of feeding of a welding wire to the arc, and the position of the end of the welding wire independently of the rate of wire feeding. As the arc is moving relative to the work, the average position of the end of the welding wire depends upon the rate of the feeding of the wire and the regulation of the position of the end of the wire. The instantaneous or electrically effective position of the end of the wire, however, is not controlled by the feeding rate of the wire, but by a centrifugal governor capable of producing a force which will positively and accurately adjust the arc length as the characteristics of the arc may vary.

Broadly, the welding apparatus embodying my invention comprises a framework upon which the welding apparatus is mounted, and under which a car carrying the work is adapted to pass, thereby providing an efficient manner for bringing the work into position for the welding operation where a large number of duplicate pieces are to be welded. In this preferred embodiment of my invention the wire feeding means, arc regulating means, and means for oscillating the arcing end of the welding wire across the line of weld on the work, are all carried by a carriage which is slidably mounted on a bed or slide which is supported on the framework.

Figure 1:
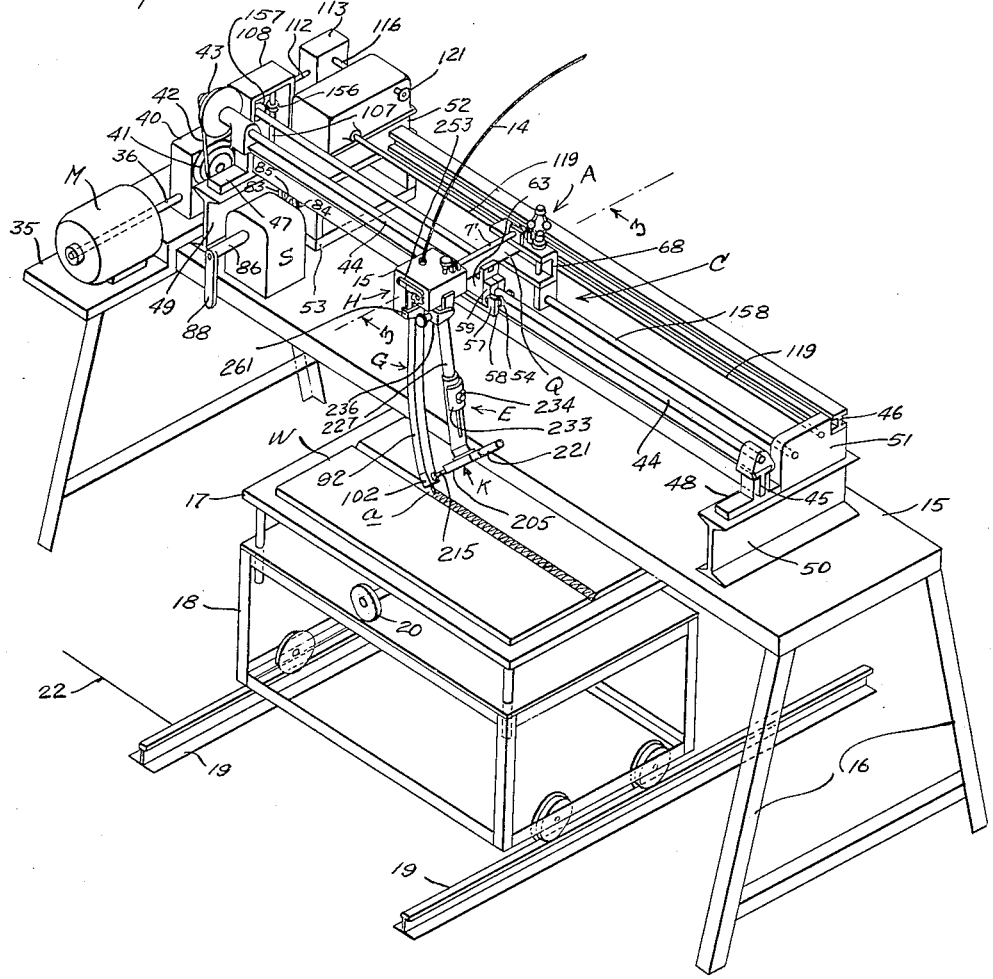
Figure 10:
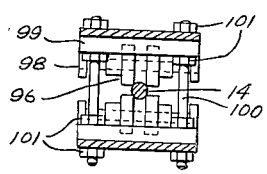
Fig. 10 is a section of the flexible wire guide taken on line 10—10 of Fig. 8.

Referring now more particularly to Fig. 1, a welding strip or wire 14 of any suitable fusible material is fed toward the work W by the welding apparatus, the various elements of which are mounted on a framework 15 having supporting legs 16. The wire 14 fused by the arc at $a$ deposits metal on the work W, which may consist, for example, of two plates to be welded together along their edges, and which may be held on a platform 17 mounted on a car 18 which runs on rails 19—19. The height of the platform 17 may be adjusted by means of a handwheel 20 which engages with suitable lifting and lowering mechanism (not shown).

Referring to Fig. 2, suitable electric energy is supplied to a welding circuit 21 and 22 from a constant voltage generator D through a ballast resistor 23, which acts to reduce the voltage of the welding circuit as the welding current increases. The conductor 21 may be electrically connected to the welding wire 14, and the conductor 22 may be connected to the work W. In the welding apparatus shown in Fig. 1, it may be preferable to connect conductor 22 to the work W through the rail 19, car 18 and platform 17, so that it will not be necessary to connect the work to the welding circuit when each car is moved into position for the welding operation.

A single electric motor M is employed for actuating and driving all the mechanism of the welding apparatus. As shown in Fig. 2, the motor M is preferably a cumulative compound motor having an armature 24 connected to be responsive to the voltage across the arc $a$, a shunt field winding 25 adapted to be energized at a substantially constant value, and a second field winding 26 connected to be responsive to the arc current and arranged to act cumulatively with field winding 25. The armature leads 27 and 28 are adapted to be connected through the contacts of a reversing switch S to conductors 29 and 30, which in turn are connected to conductors 21 and 22, respectively, across the arc $a$. The shunt field winding 25 is connected by conductors 31 and 32 across the terminals of the constant voltage generator D, and the field winding 26 is connected across the ballast resistor 23 by conductors 33 and 34, so as to be responsive to the current in the welding circuit. The field winding 25 is so arranged that it aids field winding 26.

Referring to Figs. 1 and 2, the motor M is mounted on a plate 35 extending outwardly from one end of the framework 15 and forming a part thereof. The motor shaft 36 carries a worm 37 which meshes with a worm gear 38 fixed on a shaft 39. The worm 37 and worm gear 38 are enclosed in a casing 40, as shown in Fig. 1, the motor shaft 36 and shaft 39 being journaled in openings formed in the walls of the casing. Fixed to the shaft 39 is a stepped pulley 41 which drives a belt 42 connected to another stepped pulley 43 secured to a threaded lead screw 44. The lead screw 44 constitutes the means for driving a carriage C movable along a bed or slide.

This bed comprises a T-shaped beam 45 and an I-shaped beam 46 mounted longitudinally of the framework 15. The beam 45 is supported by end brackets 47 and 48 mounted on transverse end beams 49 and 50, which are secured to the framework 15, and the lead screw 44 is journaled in the end brackets 47 and 48 above the beam 45. One end of the beam 46 is secured to a block 51 mounted on the end beam 50, and the other end thereof is secured to the wall of a housing 52 of a variable speed change device to be described, which is mounted on a platform 53 supported by the framework 15.

The carriage C, which is shown in dotted lines in Fig. 2 and in full lines in the other figures, carries the welding head H and other mechanism of the apparatus. Referring more particularly to Figs. 1, 3, 4, and 6, the carriage C comprises rollers 54 secured to a pair of spaced rotatable shafts 55 extending through a carriage body 56 arranged to move along the top of beam 45 below the lead screw 44. On each side of the body 56 a U-shaped side bar 57 is threadedly secured at its opposite ends to the roller shafts 55, the bars being tapered inwardly at their lower portions, as indicated at 58 in Fig. 3, so as to slidably engage with the outward tapered ends of the flanges of the beam 45, and thereby guide the carriage C on the beam as it is moved.

Referring to Figs. 6 and 7, the carriage C is adapted to be engaged and disengaged from the lead screw 44 by a split nut 59 carried by the carriage C adjacent the right hand rollers 54. The two halves of the split nut 59 are moved toward and away from each other by turning the knob 60 of a stud 61 having left and right hand threads, which extends through each half of the split nut 59 and body 56, and which is provided with an annular groove between the right and left hand threads into which a pin 62 is fitted to keep the stud centrally positioned in the body at all times.

Adjacent the split nut 59 and in the space between the roller shafts 55 a clevis block 63 arranged to straddle the lead screw 44 is secured by pins 63a to each side of the carriage body 56. Above the lead screw the clevis block is provided with two upwardly extending walls 64 and 65 between which a tube 66 is adapted to be supported at 67. This tube extends through the base of a horizontal U-shaped bracket 68 and an opening in a vertical plate 69 welded thereto at 69a, as shown in Fig. 3. A horizontal U-shaped bracket 70 secured to the lower part of the plate 69 has threadedly secured to it a stub shaft 71 which carries a roller 72 adapted to move between the upper and lower flanges of the I beam 46 of the bed. By guiding the carriage in the beam 46 in this manner, the proper mechanical balance of the welding head H, also carried by the carriage, is obtained.

The welding head H is carried by the carriage C by means of a tube 73, which is secured at its threaded reduced end 74 to a threaded opening in the inside wall of the welding head casing 75. The tube 73 slidably fits within the stationary or fixed tube 66 to form an adjustable quill Q for the feeding mechanism drive, hereinafter to be described. It will thus be seen that the welding head H is adjustable transversely of the carriage C, and may be clamped into any position by a stud 76 which is fixed to the inner tube 73 and passes through a longitudinal slot 77 in the outer tube 66 and a clamping member 78, the end of which is threaded to receive a nut 79.

The mechanism for stopping the travel of the carriage C in either direction, referring to Figs. 1, 2, and 3, comprises a movable rod 80 which is supported by a bracket 81 fixed to the web of T beam 45, so that it will be below the inside U shaped side bar 57. Two stops 81a projecting upwardly into the path of travel of the inner U shaped side bar 57 are slidably mounted on the bar 80, and may be clamped into position by cap screws 82. At the left end of the rod 80 two spaced downwardly projecting members 83 and 84 are provided between which is arranged an upwardly extending lever arm 85 fixed to one end of a rotatable shaft 85a. To the shaft 85a is fixed a downwardly extending lever arm 85b which actuates the movable member of reversing switch S. This movable member comprises two switching members 86a and 86b connected by a horizontal insulating member 87 which is pivotally connected at 87a to the lower end of lever arm 85b. The upper ends of switching members 86a and 86b are connected to the conductors 27 and 28, and the lower ends thereof cooperate with stationary contacts 29a, 30a, and 30b, the intermediate contact 29a being connected to conductor 29 and the outside contacts 30a and 30b being connected to conductor 30. During the operation of the apparatus, the reversing switch S either completes the circuit of the armature 24 in one direction with the switching members 86a and 86b cooperating with contacts 29a and 30a, or completes the armature circuit in the opposite direction with the switching members 86a and 86b cooperating with contacts 29a and 30b. When the carriage C strikes one of the stops 81a, the lever arm 85 is moved by either projection 83 or 84 to cause the switching members 86a and 86b to move to an intermediate position between the contacts, thereby opening the circuit of the motor armature 24 and stopping the motor. The handle 88 of switch S may then be moved in the opposite direction to reverse the direction of rotation of the motor M, and drive the carriage C in the opposite direction.

The welding wire may be supplied from a reel carried by an insulated support (not shown) moving with the carriage C. Referring to Figs. 8 and 11, the welding wire 14 is supplied to the feeding mechanism in the casing 75 through the bore of a guide bearing cap 89 and aperture of an upper guide plate 90 secured thereto, the plate 90 being movably secured (not shown) over an opening in the top of the casing 75. The welding wire passes out of the casing through an opening at the bottom thereof, under which a lower guide plate 91, having an aperture through which the wire passes, is movably secured (not shown). By movably securing the guide plates 90 and 91 to the casing 75 opposite the wire inlet and outlet openings in the casing, different size welding wire may be guided to the proper position in the feeding mechanism, hereinafter to be described.

The wire is fed from the casing 75 to the proximity of the work through a flexible guide G. The guide G comprises a pair of spaced flexible metallic strips 92 secured at their upper ends by screws 93 to opposite sides of a block 94 which is attached to the lower guide plate 91, and which is provided with a bore 95 through which the wire 14 is fed. The wire 14 is guided between the coacting surfaces of a plurality of adjacent rollers 96 spaced apart along the length of the strips 92. These rollers may be grooved at their peripheries to accommodate the wire, and are mounted on shafts 97 supported in the inwardly projecting ends 98 of brackets 99 which are arranged opposite each other. The brackets 99 may be secured to the inner surfaces of the strips 92 by means of studs 100 extending between the strips on opposite sides of the wire, and having threaded ends to receive nuts 101 for securing the brackets to the strips and for regulating the distance between the rollers to accommodate different size wire. A closure at the lower end of the guide G may be formed by the strips 92, side plates 102 secured thereto, and a member 103 covering the discharge end and having an opening 104 through which the wire 14 is guided to the work at an acute angle.

The drive for actuating the welding wire feed mechanism to feed the wire 14 from the welding head H to the arc a to deposit metal on the work includes the motor shaft 36, which extends through and beyond the casing 40. A bevel gear 105 fixed to the end of the motor shaft 36 meshes with a bevel gear 106 carried on the lower end of a vertical shaft 107, which is journaled in a casing 108. An overrunning or one way clutch may be carried on the shaft 107, as indicated at 109, so that the feeding mechanism will only be operative when the carriage C is moving in the direction of progress of a weld, as hereinafter described. A bevel gear 110 secured to the upper end of shaft 107 meshes with another bevel gear 111 carried on the horizontal shaft 112. This shaft extends through and is journaled in openings in the walls of the casing 108 and casing 113. A worm 114 fixed to the shaft 112 within the casing 113 meshes with a worm gear 115 carried on a shaft 116, which drives a variable speed change device housed within the casing 52.

The speed change device is provided for changing the speed of the feeding mechanism drive infinitesimally while the apparatus is in operation. As shown in Fig. 2, the speed change device may comprise a driving pulley fixed to the shaft 116, which consists of two half pulleys 117 having their inside walls cooperating to form a V in which a belt 118 rides. The belt 118 is connected to drive another pulley fixed to a feed shaft 119, which is journaled in a wall of the speed change device housing 52 and block 51. The driven pulley also consists of two cooperating half pulleys 120 similar to the half pulleys 117. In order to vary the speed of the feed shaft 119, the axial distances between the half pulleys 117 and 120 may be changed simultaneously in any suitable manner (not shown), so that as the axial distance between the half pulleys 117 is increased, the distance between the half pulleys 120 is decreased; or, as the axial distance between the half pulleys 117 is decreased, the distance between the half pulleys 120 is increased. In this manner a very fine change of speed may be obtained by causing the V belt 118 to ride nearer the periphery of one pulley while simultaneously causing the belt to ride further away from the periphery of the other pulley. The speed change device may be provided with a handknob 121 outside the casing 52, as shown in Fig. 1, for facilitating the changing of the speed of the feeding mechanism.

The mechanism for connecting the feed shaft 119 to the feeding mechanism carried on the carriage C includes a worm 122 which is splined to the feed shaft 119, as indicated at 123 in Fig. 3, and which slides along it, as the carriage C is propelled by the lead screw 44, between two sleeve bearings 124 arranged inside the end walls of the vertical U-shaped bracket 76, as shown in Fig. 4. A worm gear 125 carried by the carriage C and meshing with the worm 122 is fixed at one end of a shaft 126, which extends through the quill Q formed by the slidable inner tube 73 and fixed outer tube 66, across the welding head casing 75, and finally projecting through an opening in the outside wall of the casing. The shaft 126 may be journaled by a bearing 127 arranged within the end of the fixed tube 66, a bearing 128 arranged in the opening in the casing 75 adjacent the threaded reduced end 74 of the tube 73, and a bearing 129 arranged in the recessed opening in the outside wall of the casing. Retaining members 130 and 131 may be secured to the inside walls of the casing 75 at the openings therein by screws 130a and 131a, so as to hold the bearings 128 and 129 in position.

Splined to the shaft 126 within the casing 75 are two bevel gears 132 which are spaced apart and secured to the bearings 128 and 129, respectively. By this construction the retaining members 130 and 131 retain the gears 132 in fixed position with respect to the casing 75, so that when it is desired to move the welding head H in or out from the carriage C, by means of the slidable inner tube 73, the different elements of the feeding mechanism within the casing 75, hereinafter to be described, will always remain in a fixed position with respect to each other. A bevel gear 133 is fixed to each of the spaced shafts 134, and each gear meshes with one of the gears 132 on the shaft 126. As shown in Fig. 8, each of the shafts 134 extends through and is journaled in an opening 135 in a partition wall 136 in the upper part of the casing 75, and an opening 137 in a side wall of the casing. The shafts 134 constitute the driving means for the welding wire feeding mechanism.

The feeding mechanism comprises two belts 138 (of which one is shown in Fig. 9) arranged adjacent each other and adapted to be driven by sheaves 139 mounted on the shafts 134. Follower sheaves 140 similar to the driving sheaves are arranged in the lower part of the casing 75, and are mounted on shafts 141, each of which is journaled in openings 142 and 143 in the walls of the casing.

The belts employed are preferably metallic ribbons, such as bronze, for example, having aligned longitudinal grooves 144 of different sizes, which fit into correspondingly sized grooves in the sheaves 139 and 140, so that welding wires of various sizes may be accommodated between the aligned grooves and effectively gripped between the coacting surfaces of the ribbons.

In order to increase the gripping effect of the belts 138, contact shoes 145 may be arranged to press against the backs of the ribbons and toward each other in the space between the driving sheaves 139 and follower sheaves 140. The contact shoes 145 are preferably of triangular shape having a flat base and concave sides, as shown in Fig. 9, so that the space between the sheaves will be effectively used. Each of the shoes 145 is provided with two outwardly extending projections 146 and 147 on each side thereof. The projections 146 and 147 are vertically spaced and slide in horizontal grooves 148 and 149, respectively, formed in the inside of the partition wall 136 and opposite side wall of the casing 75, as shown in Figs. 4 and 8. With this construction the shoes 145 are free to slide to and from the belts 138 with any slight variations in the size of the welding wire 14 as it is being fed to the arc.

The contact shoes 145 may be pressed toward the belts 138 by a yoke comprising transverse bars 150 arranged back of each shoe and having projections 151 opposite similar projections 152 on the backs of the shoes. Springs 153 held in place by these projections press the shoes against the ribbons by means of the yoke, the tension of which springs may be adjusted by a threaded stud 154 arranged on each side of the shoes and passing through threaded openings at the ends of bars 150. In order to facilitate adjustment of the pressure of the shoes 145 against the belts 138, the studs 154 may have right and left hand threads at their opposite ends, so that the tension of the springs may be adjusted from one side of the feeding mechanism.

It will thus be seen that the welding wire 14 is effectively gripped between the coacting surfaces of the belts 138, together with the pressure of the shoes 145 against the back of the belts. In my preferred embodiment the bases of the shoes consist of hard bronze, as indicated at 155 in Fig. 9, although any other suitable material may be employed. The shoes 145 may also serve to conduct electric energy to the welding wire 14 through the belts 138 by connecting conductor 21 of the welding circuit to one of the shoes, as diagrammatically shown in Fig. 2. In order to dissipate the heat generated in the shoes 145 by the friction and contact resistance between the shoes and belts 138, they may be cooled in any convenient manner. I prefer to employ hollow shoes through which a cooling medium may be circulated in any suitable manner.

The mechanism carried on the carriage C for moving the lower or discharge end of the guide G to and from the work to establish and stabilize the arc a is also actuated by the motor M, and the drive therefor is taken off the feed mechanism drive at the vertical shaft 107 beyond the one way or overrunning clutch indicated at 109 in Fig. 2. The drive for the arc regulating mechanism comprises a spiral gear 156 which is fixed to the shaft 107 above the clutch 109, and which meshes with a spiral gear 157 fixed to shaft 158. This shaft is journaled at one end in a wall of the casing 108 (shown removed in Fig. 1), and at the opposite end in the block 51. The shaft 158 constitutes the driving means for a centrifugal governor A, which controls the arc regulating mechanism.

The governor A carried on the carriage C comprises a rotatable shaft 159 which extends vertically downward through openings in the top and bottom sides of the horizontal U-shaped bracket 68, and is journaled at the openings by bearings 160 and 161 respectively, as shown in Fig. 5. The bearings 160 and 161 are maintained in position by retaining plates 160a and 161a which are secured by screws 160b and 161b to the top and bottom sides respectively of bracket 68. A bevel gear 162 carried by the shaft 159 adjacent the lower end of the bottom gearing 161 meshes with a bevel gear 163, which may be formed integrally with a sleeve 164 splined to the shaft 158, as indicated at 165. As the carriage C is propelled along the framework 15, the sleeve 164 moves therewith between bearings 166 and 167 arranged in recessed openings in downwardly extending end walls 168 and 169 of the U-shaped bracket 68. The bearings 166 and 167 are held in place by retaining plates 166a and 167a which are secured by screws 166b and 167b to the end walls 168 and 169, respectively. The end wall 169 is removable and attached to one end of the bottom side of the bracket by cap screws 170 to facilitate the assembly of the apparatus.

The governor fly-balls 171 are connected by means of flexible metallic strips 172 to a hub member 173, which is fixedly secured to the upper end of the shaft 159 and rotatable therewith. The fly-balls are also connected by means of similar flexible metallic strips 174 to a rotatable hub member 175 which is free to move up and down the shaft 159 as the fly-balls 171 assume different positions depending upon the speed of rotation of the shaft. The lower reduced portion 176 of the movable hub 175 forms the inner race of a ball bearing 177, the outer race 178 of which is provided with a housing 179 secured thereto by a threaded screw 180. Referring to Figs. 4 and 5, an arcuate shaped member 181 attached to the housing 179 has mounted thereon, at its outer periphery, a vertical toothed rack 182. In order to prevent side movement of the toothed rack 182a, vertical guide members 183 having projections 182b fitting into grooves in the rack are arranged on each side thereof, and mounted on the top side of the U-shaped bracket 68. It will thus be seen that rotation of the governor shaft 159 will cause the fly-balls 171 to move outwardly by centrifugal force, thereby moving the lower hub 175, bearing 177, and toothed rack 182 upwardly.

The motion of the toothed rack 182 is transmitted to the arc regulating head K, to be described, by means of a flexible transmission shaft. Referring to Figs. 3 and 4, the mechanism includes a telescopic shaft T extending across the carriage C through recessed openings in vertical plates 183 and 184, which are fixed by cap screws 183a and 184a on top of the casing 75 and the outer end of the top side of the U-shaped bracket 68, respectively. The shaft T comprises a square shaped shaft 185 having an annular end portion 186 which is journaled at the recessed opening in the plate 184 by a bearing 187. This bearing is provided with a cover member 188 which is secured by screws 187a to the inner side of the plate 184. A gear 189 fixed to the end of the shaft 185 is adapted to mesh with the toothed rack 182. Longitudinal movement of the shaft 185 is prevented by the cover member 188, which fits against a shoulder formed by the square portion of the shaft 185, and by a sleeve member 190 arranged on the end of the shaft between the plate 183 and gear 189 and secured thereto by a set screw 190a.

A hollow square shaped shaft 191 arranged to slip over the shaft 185 and having a solid circular end portion 192 is journaled at the recessed opening in the plate 183 by a bearing 193, which is provided with a cover member 194a secured by screws 194b to the inner side of the plate 183.

A bevel gear 194 fixed to the end of the shaft 191 meshes with a bevel gear 195. The bevel gear 194 is retained in place by its hub 194c, the end of which is adjacent the outer side of the plate 183, and by the cover member 194a, which fits against a shoulder 192a in the circular portion 192 of the shaft 191. It will thus be seen that the telescopic shaft T for the arc regulating mechanism and the adjustable quill Q for the feeding mechanism drive provide a means for moving the welding head H laterally with respect to the longitudinal movement given to it by the lead screw 44.

The bevel gear 195 is carried on a vertical shaft 196 provided with a knurled knob 197 at its upper end, so that the arc regulating mechanism may be adjusted manually. The shaft 196 extends downwardly through openings in the top and bottom of the overhanging front part of the casing 75, as shown in Fig. 8, and is journaled at the openings by bearings 198 and 199, respectively. The vertical shaft 196 is connected at its lower end by a universal coupling 200 to a hollow square shaped shaft 201 within which a movable square shaped shaft 202 is adapted to fit The shaft 202 in turn is connected by a universal coupling 203 to a shaft 204 which constitutes the means for actuating the mechanism in the arc regulating head K.

Referring to Figs. 8 and 12, the head K comprises a housing 205 having raised portions 206 and 207 in the side walls 208 and 209 for receiving bearings 210 and 211, respectively. These bearings journal the shaft 204, which extends through an opening in the raised portion 206 and abuts the inside of the raised portion 207. A cam constituting a roller 212 eccentrically mounted on the shaft 204, between the bearings 210 and 211, is adapted to rotate within the bore of a cam block 213. This block is adapted to slide back and forth within a rectangular cam follower 214, when the roller 212 is rotated to different angular positions by the governor A, thereby causing a reciprocating motion of the follower 214 within the housing 205. The motion of the follower 214 is transmitted to the discharge end of the wire electrode guide G by a rod 215. The rod 215, which extends through an opening in the bottom of the housing 205 and the bore of a guide member 216 attached to the housing adjacent the opening, is connected at one end thereof to the lower side of the rectangular follower 214 at 217. The opposite end of the rod 215 is pivotally connected to the guide G by a pin 218 secured between upwardly extending projections 219 attached to the lower end of the upper flexible strip 92.

It may be desirable to resiliently bias the follower 214 against the force of gravity of the guide G and of the welding wire 14 being guided, so that the arc regulating mechanism will be substantially free from any outside forces and thereby move the discharge end of the guide G solely in accordance with the speed of the governor A. The resilient bias may comprise a helical spring 220 arranged within a cylinder 221 which is secured at its lower end to a guide member 222 mounted adjacent an opening at the top of the housing 205. A rod 223, which extends through the opening at the top of the housing, the bore of the guide member 222 and the spring 220, is connected at one end thereof to the upper side of the rectangular follower 214 at 224. A bushing 225 arranged at the opposite end of the rod 223 is adapted to be slidable within the cylinder 221, so as to compress the spring 220 when the follower 214 causes the guide G to move downwardly. The upper end of the rod 223 may be threaded to receive a nut 226 for adjusting the tension of the spring 220.

In this embodiment of my invention the arc regulating head K is attached to an adjustable tubular arm E which is supported by the welding head H, and to which may be imparted an oscillatory motion across the line of weld in a manner hereinafter to be described. The tubular arm E, through which the shafts 201 and 202 of the flexible shaft of the arc regulating mechanism extend, comprises an outer tube 227 bent at 228 near its lower end, so that the arc regulating head K will be substantially perpendicular to the discharge end of the wire electrode guide G. The lower end of the tube 227 fits over the raised portion 206 of the housing 205, and a flanged member 229 surrounding the tube is secured thereto and to the side wall 208 of the housing in any suitable manner.

The tube 227 is slidable over an inner tube 230, and these tubes may be clamped together to give any desired length of the arm E by a stud 231 which is secured to the inner tube 230. The stud 231 passes through a longitudinal slot 232 in the outer tube 227, an opening in an arcuate shaped locking cap 233, and is threaded to receive a wing nut 234.

The tubular arm E is pivotally supported below the front overhanging part of the casing 75 by securing the upper threaded end of the tube 230 to a threaded opening in an angle member 235, as shown in Fig. 3. The angle member 235 serves as the means for adjusting the angle of the tube E with respect to the work, and may be secured to a supporting angle member 236 by a bolt 237 which is threaded to receive a clamp nut 238. The angle member 236 is pivotally supported at its outer end by a pin 239 to a vertical plate 240, which extends downwardly from and is secured to the overhanging front part of the casing 75. As shown in Fig. 4, the angle member 236 may be formed integral with a horizontal bar 241, which is secured by a screw 242, as shown in Fig. 8, to a flat circular plate 243 beveled at its periphery. The bar 241 and plate 243 together are pivotally mounted by a cap screw 244 to the lower front wall of the casing 75, and a beveled block 245 may be locked against the beveled edge of the plate 243 by a cap screw 246 passing therethrough and secured to a projection 247 at the bottom of the casing 75, so that the arm E may be fixed to any desired angular position transverse to the work.

When it is desired to impart an oscillatory movement to the arm E transverse to the work, the block 245 is moved from its locking position, and the horizontal bar 241 oscillated by a mechanism carried on the welding head H and actuated by the feeding mechanism drive. As shown in Figs. 3, 4, and 11, the oscillating mechanism may comprise a cam 248 fixed to the shaft 126 outside the casing 75 and between the bearing 129 and an end plate 249, which is secured to the casing 75 by screws 249a which pass through a spacer bar 250. By this construction the cam 248 is always maintained in its relative position to the casing when the welding head H is moved in and out from the carriage C. A cam follower 251 is carried by a pin 252 at one end of a rocker arm 253. The opposite end of the arm 253 is pivotally attached by a cap screw 255 to the side wall of the casing 75. The oscillatory movement of the rocker arm 253 produced by the cam 248 is transmitted to the horizontal bar 241 by an adjustable connecting rod comprising a link 256 having one end thereof connected to the rocker arm 253 by a bolt 257 which passes through a slot 254 in the rocker arm. The bolt 257 is threaded to receive a nut for holding the link 256 in any desired position along the slot. The opposite end of the link 256 is threadably connected at 258 to one end of a rod 259. The head 260 at the opposite end of the rod, in its upward movement, is adapted to engage a right angle projection 261 at one end of the bar 241, through which the rod 259 passes. During the downward movement of the rod 259, the projection 261 is also moved downwardly by the tension of a spring 262 having one end thereof connected at 263 to the right hand end of the bar 241, and the other end thereof connected to a pin 264 secured to the inside wall of the casing 75, as shown in Fig. 3. It will thus be seen that, when the cam 248 is rotated, an oscillatory motion is transmitted to the arm E for the purpose of distributing the weld metal transversely of the seam to be welded in a manner commonly known as weaving. The oscillatory motion of the arm E can be adjusted to any desired amplitude at the beginning of or during a welding operation by connecting the link 256 to the proper position along the slot 254 of the rocker arm 253.

The operation of the welding apparatus illustrated in the drawings is substantially as follows: It will be assumed that the generator D is being driven in any suitable manner to supply current at a constant voltage; that the belt 42 is arranged on the pulleys 41 and 43 so that the carriage C will be driven at the proper speed by the lead screw 44; that the welding head H is moved to the proper position transverse of the carriage C to align the guide G with the line of weld on the work; that the oscillatory mechanism is adjusted to give the desired amplitude of oscillations of the arm E; and that the length of the arm E is adjusted so that the governor A will cause the end of the wire 14 to contact the work W when the motor M is first started. With the above assumed conditions, welding current is supplied to the wire 14 from one terminal of the generator D through conductor 21, resistor 23, contact shoe 145, and the belt 138 of the feeding mechanism. The welding circuit is completed from the work W to the opposite terminal of the generator D through the platform 17, car 18, rail 19 and conductor 22.

When the handle 88 of the switch S is moved to the left or "forward" position, the armature 24 of the motor M is connected across the welding wire 14 and work W through conductors 27 and 28, switching members 86a and 86b, contacts 30a and 29a, conductors 30 and 29 and conductors 22 and 21. When the motor M is first started by moving the switch S to its "forward" position, the wire 14 is not contacting the work W, the excitation of the shunt field winding 25 is at its fixed value since it is connected across the terminals of the constant voltage generator D, and the excitation of the series field winding 26 is at a minimum value because the welding circuit is not completed across the wire 14 and the work W. Upon starting a welding operation, therefore, the motor M will run at its maximum speed because the impressed armature voltage is a maximum and the sum of field excitations is a minimum.

When the motor M is started, all of the mechanism of the welding apparatus will begin to operate simultaneously to automatically and continuously carry out the welding operation. Thus, the motor shaft 36 will rotate the lead screw 44 through the worm 37, gear 38, pulleys 41 and 43 and split nut 59 to propel the carriage C to the left along the beams 45 and 46. The motor shaft 36 will also rotate the feed shaft 119 through the gears 105, 106, 110, and 111, worm 114, gear 115 and pulleys 117 and 120. The rotation of the feed shaft 119 will actuate the endless belts 138 of the feeding mechanism through gears 133, 132, 125 and worm 122 to feed the wire 14 to the work W through the guide G. At the same time the motor shaft 36 will rotate the governor shaft 158 through the gears 105, 106, 156 and 157 to drive the governor shaft 159 and raise the lower governor hub 175 and toothed rack 182. The cam 212 in the arc regulating head K will then be caused to rotate by means of the transmission mechanism connecting the cam shaft 204 in the head K to the toothed rack 182 through the gears 195, 194 and 189. The rotation of the cam 212 will move the lower end of the guide G downwardly, by means of the cam follower 214 and rod 215, to bring the wire 14 into contact with the work W. It will thus be seen that, with the motor M running at its maximum speed in starting a welding operation, the feed mechanism is assisting the arc regulating mechanism quickly to bring the wire 14 into contact with the work W.

When the wire 14 contacts the work, the voltage impressed across the armature 24 becomes substantially zero, and the excitation of field winding 26 connected across the resistor 23 becomes a maximum. Since the field winding 25 is excited at a constant value, and the field winding 26 acts cumulatively with field winding 25, the total field strength is at a maximum. This combination of maximum field and quickly dying armature strength results in an almost instantaneous stopping of the motor M, due to the regenerative braking action of the motor under these conditions. That is, a sudden strengthening of the total field and lowering of armature impressed voltage cause a part of the kinetic energy of the rotating parts to be converted into electrical energy which is pumped back into the electric system.

Immediately the wire 14 will cease to be fed to the work W through the guide G, and the governor A will collapse and move the wire 14 from the work by means of the transmission mechanism connecting the cam shaft 204 in the arc regulating head K and the toothed rack 182 of the governor A.

The withdrawing of the wire 14 out of contact with the work W establishes the arc a and quickly accelerates the motor M, as an intermediate value of voltage will be impressed across the armature 24, and the total field strength of the windings 25 and 26 will decrease from its maximum value. The carriage C will then be propelled along the framework 15, the feeding of the wire 14 will be resumed by the wire feeding mechanism, and the governor A will be driven to move the arcing end of the wire 14 to a position which will give normal arcing conditions. If it is desired to strike the arc a manually, the handknob 197 fixed to the upper end of shaft 193 may be turned to move the discharge end of the guide G toward the work W.

If the feeding rate of the wire 14 is not satisfactory for normal operating conditions at the beginning of the welding operation, the variable speed change device can be adjusted without interruption of the arc, by means of the handknob 121 as shown in Fig. 1, to obtain accurately the correct normal rate of feeding of the wire 14. In this manner, a very fine adjustment of the rate of wire feeding may be obtained independently of the speed of the motor M, after the welding operation has been started.

It will thus be seen that the rate of travel of the arc relative to the work, the rate of feeding the welding wire to the work, and the regulation of the arc length are all controlled by a single electric motor, the speed of which varies in accordance with the slightest change in the voltage and current of the arc. As the arc is moving relative to the work, the average position of the arcing end of the wire depends upon both the rate of the feeding of the wire and the regulation of the position of the end of the wire. Thus, when the length of the arc $a$ decreases, due to an increase in the height of the arcing puddle, for example, the armature impressed voltage will decrease and the excitation of the field winding 26 will increase to decrease the speed of the motor. This will simultaneously decrease the rate of wire feeding and move the discharge end of the guide G from the work W to increase the arc length to its predetermined normal value. Conversely, when the length of the arc $a$ increases, the armature impressed voltage will increase and the excitation of the field winding 26 will decrease to increase the speed of the motor. This will simultaneously increase the rate of wire feeding and move the discharge end of the guide G toward the work W. The average length of the arc during a welding operation, therefore, is dependent upon both the rate of wire feeding and the independent regulation of the arc length. The instantaneous or electrically effective position of the arcing end of the welding wire at any particular moment, however, is dependent upon the arc regulating mechanism, because as soon as the voltage and current of the arc deviate from a normal value, due to a change in the length of the arc, the speed of the centrifugal governor will immediately change to adjust the arc length to its predetermined normal value. Stating it in another way, in regulating the instantaneous position of the arcing end of the wire, the wire is moved many times faster by the centrifugal governor than by a change in the rate of feeding of the wire. A change in the voltage and current of the arc, therefore, immediately moves the position of the end of the wire to maintain the arc length at a predetermined normal value. While the position of the end of the wire is being regulated, the rate of feeding of the wire is also being changed. The amount that the wire was temporarily over- or under-fed will be corrected.

After the change in the voltage and current of the arc, in some instances the wire may be fed toward the work at the old prior rate and the arcing end of the wire may assume the same position it had before the change occurred. In other instances, the feeding rate of the wire may be slightly different with a correspondingly slightly different position of the arcing end of the wire. In either instance, the length of the arc is maintained substantially constant. It can thus be seen that the wire tip position and wire feeding rate are interrelated to always insure substantially the same rate of metal deposition on the work. By maintaining the length of the arc substantially constant in this manner, a uniform heating is obtained along the line of weld; and since the rate of feeding of the wire is proportional to the rate of travel of the carriage relative to the work, a substantially uniform deposit of metal is obtained on the work.

During the welding operation, as the arc is moving longitudinally with respect to the framework 15, a transverse oscillating motion may also be imparted to the end of the wire 14 across the line of weld. The oscillatory movement is transmitted by the cam 248 on the shaft 126 and the tension spring 162 to the arm E through the cam follower 251, rocker arm 253, link 256, rod 259, bar 241, angle member 236 and angle member 235 to which the tube 230 of the arm E is secured. Referring to Fig. 3, when the rod 259 is moved to its upper position by the rocker arm 253 the left end of the bar 241 is raised by means of the rod 259. The spring 262 is biased against this action of the oscillating mechanism, and raises the right end of the bar 241 when the rod 259 is moved to its lower position. In this manner, a uniform deposit of metal is insured across the weld as the arc moves relative to the work.

When the welding operation is finished, the left end of the inner side bar 57 of the carriage C engages the stop 81a to move the rod 80 to the left. This will cause the projection 84 to move the lever arm 85 to a vertical position, thereby moving the switching members 86a and 86b from the left hand or "forward" position to an "off" position intermediate the contacts 29a, 30a and 30b. This opens the circuit of the armature 24 and stops the motor M, thus causing the wire tip to be withdrawn and the arc broken. To return the carriage C to the right, so that it will be in position for the starting of another welding operation, the operator moves the handle 88 of the switch S to the right. This will move the switching members 86a and 86b to the right or "reverse" position, and energize the armature 24 in the opposite direction across the conductors 21 and 22 through the conductors 27 and 28, switching members 86a and 86b, contacts 29a and 30b and conductors 29 and 30. The motor will then rotate in the opposite direction to propel the carriage C to the right by means of the lead screw 44.

When the motor shaft 36 is rotating in the reverse direction, the one-way or overrunning clutch 109 carried by shaft 107, which is driven by the motor shaft 36 through gears 105 and 106, disengages, so that the feed and governor shafts 119 and 156 will not rotate. This prevents the wire being fed backward, when the carriage C is being moved back to its starting position, and also leaves the governor A in a collapsed position, thereby maintaining the end of the wire 14 out of contact with the work W. When the carriage reaches its starting position the right end of the inner side bar 57 engages the other stop 81a to move the rod 80 to the right. This will cause the projection 83 to move the lever arm 85 to a vertical position, thereby moving the switching members 86a and 86b from the "reverse" position to the "off" position. This completes the cycle of operation of the apparatus, which may again be started by moving the switch S to its "forward" position.

It will thus be seen that an automatic welding apparatus is provided which is reliable and sensitive in operation. Only a single motor responsive to the voltage and current of the arc is required to operate the mechanism of the apparatus. By providing a cumulative compound motor, accurate regulation of the variable factors of automatic arc welding is obtained. The combination of the cumulative compound motor and the centrifugal governor driven thereby insures a reliable and quick method of establishing and stabilizing an arc. In starting the welding apparatus the welding wire contacts with the work only momentarily upon the sudden stopping of the motor under these conditions, because the sudden collapse of the governor quickly withdraws the wire out of contact with the work to establish the arc.

The invention is broadly applicable to carbon arc welding as well as metallic arc welding. In carbon arc welding the wire feeding and oscillating mechanism would be substantially the same, but the means for guiding the welding wire to the arc would not be affected by the action of a mechanical device, such as a governor. The governor in carbon arc welding would act upon a carbon or graphite electrode to move the arcing end thereof to and from the work, and the electrode support would be electrically insulated from the welding wire and machine.

Although I have shown my invention embodied in an electric arc welding machine in which the rate of feeding and the position of the arcing end of the welding wire are regulated in accordance with the condition of the weld as determined by the characteristics of the arc, it is not limited thereto, as it is also applicable to gas flame welding where it is desired to control the rate of feeding and the position of the welding wire in accordance with a condition of the weld. For example, the single motor employed in a gas flame welding machine to regulate the rate of wire feeding and the position of the fusing end of the wire with respect to the work may be rendered responsive to a thermal condition of the weld by so arranging a photoelectric cell that it will react to changes in the radiant energy emitted by a highly heated or melted metal at or adjacent a welding point as it progresses along the work. The photoelectric cell may be connected to a thermionic amplification unit, the output circuit of which may be connected in any suitable manner to a circuit of the motor so that its speed will vary in accordance with changes in the thermal condition of the weld. Thus, the invention is applicable to both arc and gas flame welding, and it is to be understood that the term "condition of the weld" as used in the claims includes both a weld condition as determined by the characteristic of an arc in arc welding and a thermal condition of the weld in arc or gas flame welding.

While I have shown and described a particular embodiment of my invention in which the welding wire is movable and the work stationary, it will be obvious to those skilled in the art that modifications may be made, and certain features may be used independently of others either in arc or gas flame welding, without departing from the spirit and scope of my invention.

I claim:

1. The improvement in the process of welding which consists in simultaneously varying the position of the fusing end of a welding wire with respect to the work and the rate of feeding of the wire through a single medium, and controlling the action of said medium in accordance with changes in a condition of the weld.

2. The process of electric arc welding which consists in moving an electrode to and from another electrode to vary the length of an arc established therebetween; feeding said movable electrode to the arc; simultaneously varying the position of the fusing end of said movable electrode and the rate of feeding thereof through a single medium, and controlling the action of said medium in accordance with changes in a characteristic of the arc.

3. The improvement in the process of electric arc welding in which two electrodes form part of an electric circuit; one of which electrodes is movable to and from the other electrode and is fed thereto; which consists in utilizing changes in an electrical condition in said circuit to vary the action of a single medium; and simultaneously changing the position of the end of said movable electrode and the rate of feeding thereof through said medium to establish and maintain an arc between said electrodes.

4. The process of electric arc welding which consists in utilizing a medium capable of producing a force of varying value to act on an electrode so as to move the same quickly to and from another electrode to establish an arc therebetween; feeding said movable electrode to the arc; the moving and feeding of said movable electrode, coacting to maintain the arc; and simultaneously changing the value of the force acting on said movable electrode to move the same and the rate of feeding thereof in accordance with changes in an electrical characteristic of the arc; the moving of said electrode being many times faster than the rate of change of feeding during changes of the electrical characteristic from a predetermined value.

5. Arc welding apparatus including two electrodes arranged to have an arc established therebetween, at least one of said electrodes being movable; and means responsive to electrical characteristics of the arc for actuating said movable electrode; said means including an electric motor having an armature connected to be responsive to changes in arc voltage and a field winding adapted to be excited at a substantially constant value, and a second field winding for said motor connected to be responsive to changes in arc current and arranged to act cumulatively with said first mentioned field winding.

6. Arc welding apparatus having a welding circuit including electrodes arranged to have an arc established therebetween, at least one of said electrodes being movable; a resistance connected in series relation with said electrodes; means including a member adapted normally to be continuously rotating for controlling the position of the fusing end of said movable electrode with respect to said other electrode during welding; and means responsive to changes in electrical conditions in said circuit for varying the speed of rotation of said rotating member for moving the fusing end of said movable electrode to and from said other electrode during welding; said last-mentioned means including an electric motor having an armature connected across the electrodes responsive to changes in arc voltage, a field winding, means for exciting said field winding, and a second field winding arranged to aid said first-mentioned winding, said second winding being connected in said welding circuit and adapted to be responsive to changes in current of said welding circuit.

7. Arc welding apparatus having a welding circuit including electrodes arranged to have an arc established therebetween, at least one of said electrodes being movable; a resistance connected in series relation with said electrodes; and means responsive to electrical conditions in said welding circuit for actuating said movable electrode;

said means including an electric motor having an armature connected across the electrodes responsive to changes in arc voltage and a field winding, means for exciting said field winding at a substantially constant value; and a second field winding connected in parallel with said resistance responsive to changes in arc current and arranged to act cumulatively with said first mentioned field winding.

8. Arc welding apparatus having a welding circuit including electrodes arranged to have an arc established therebetween, at least one of said electrodes being movable; a resistance connected in series relation with said electrodes; a source of energy of substantially constant voltage for said circuit; and means responsive to electrical conditions in said welding circuit for actuating said movable electrode; said means including an electric motor having an armature connected across said electrodes responsive to changes in arc voltage and a field winding connected across said source of energy, and a second field winding for said motor connected across said resistance and arranged to act cumulatively with said first mentioned field winding, said second mentioned field winding being responsive to changes in current of said welding circuit.

9. Arc welding apparatus having a welding circuit including electrodes arranged to have an arc established therebetween, a resistance connected in series relation with said electrodes, at least one of said electrodes being movable; a mechanism for actuating said movable electrode; an electric motor having a shaft connected to said actuating mechanism to drive the same; said motor having an armature connected across said electrodes and a substantially constant excitation circuit; and a second excitation circuit for said motor connected across said resistance and arranged to act cumulatively with said first mentioned excitation circuit.

10. Arc welding apparatus comprising electrodes arranged to have an arc established therebetween, at least one of said electrodes being movable; means responsive to changes in a characteristic of the arc; and means including a governor driven by said first mentioned means for actuating said movable electrode to and from said other electrode to regulate the position of the arcing end of said movable electrode with respect to said other electrode.

11. Arc welding apparatus comprising electrodes arranged to have an arc established therebetween, at least one of said electrodes being movable; an electric motor responsive to changes in a characteristic of the arc; and means including a governor driven by said motor and a connection from said governor to said movable electrode for actuating said movable electrode to and from said other electrode to regulate the position of the arcing end of said movable electrode with respect to said other electrode.

12. Arc welding apparatus having a welding circuit including electrodes arranged to have an electric arc established therebetween, at least one of said delectrodes being movable; and means responsive to changes in voltage and current of the arc for regulating the position of the arcing end of said movable electrode with respect to said other electrode; said means including an electric motor having an armature connected to be responsive to changes in voltage across the arc and a field winding adapted to be excited at a substantially constant value, and a second field winding for said motor connected to be responsive to changes in arc current and arranged to act cumulatively with said first mentioned field winding.

13. Arc welding apparatus having a welding circuit including electrodes arranged to have an electric arc established therebetween, at least one of said electrodes being movable; a resistance connected in series relation with said electrodes; and means responsive to changes in electrical conditions in said welding circuit for regulating the position of the arcing end of said movable electrode with respect to said other electrode; said means including an electric motor having an armature connected across said electrodes responsive to changes in arc voltage and a field winding connected across said resistance responsive to changes in arc current.

14. Arc welding apparatus comprising, in combination, a movable welding circuit including electrodes arranged to have an electric arc established therebetween, at least one of said electrodes being movable; a resistance connected in series relation with said electrodes; means for regulating the position of the arcing end of said movable electrode with respect to said other electrode; said means comprising an electric motor, a centrifugal governor responsive to the speed of said motor and actuated thereby, and means for connecting said governor to said movable electrode; and means for rendering said motor responsive to changes in electrical conditions in said welding circuit; said last mentioned means including an armature connected across said electrodes responsive to changes in arc voltage and a field winding, means for exciting said field winding at a substantially constant value, and a second field winding for said motor connected in parallel with said resistance responsive to changes in arc current and arranged to act cumulatively with said first mentioned field winding.

15. Automatic welding apparatus in which a movable welding wire is fed to the work, comprising the combination of means including a governor for moving said movable welding wire to and from the work; and means responsive to a condition of the weld for driving said governor.

16. Welding apparatus in which a movable welding wire is arranged to be fed toward the work, comprising the combination of means for moving the fusing end of the welding wire to and from the work; means for feeding the wire to the work; and a single device responsive to changes in a condition of the weld for actuating said moving means to regulate the position of the fusing end of the wire with respect to the work and for actutuating said feeding means to control the rate at which the wire is fed to the work.

17. Welding apparatus comprising the combination of means for moving the fusing end of a welding wire with respect to the work; means for feeding the welding wire; a single electric motor connected to be responsive to changes in a condition of the weld for actuating said moving means to regulate the position of the fusing end of the wire with respect to the work and for actuating said feeding means to control the rate of feeding of the wire to the work; and means for varying the rate of feeding of the wire independently of variations of the motor speed.

18. Welding apparatus in which a movable welding wire is fed to the work, comprising the combination of means including a member adapted normally to be continuously rotating for controlling the position of the fusing end of the welding wire with respect to the work during welding, and means responsive to changes in a condition of the weld for varying the speed of rotation of said rotating member for moving the fusing end of the welding wire to and from the work during welding.

19. Electric arc welding apparatus comprising an electric circuit including electrodes, at least one of said electrodes being movable; means including a governor for moving said movable electrode to and from said other electrode to establish and maintain an arc therebetween; and means responsive to an electrical condition in said circuit for driving said governor.

20. In an electric arc welding apparatus in which an arc is arranged to be established between two electrodes, at least one of which is movable; the combination of means for moving the movable electrode to and from the other electrode to establish and stabilize an arc therebetween; means for feeding said movable electrode to the arc; and a single means for actuating said first mentioned and second mentioned means.

21. Electric arc welding apparatus comprising the combination of a means for moving an electrode to and from another electrode to maintain an arc established therebetween; a means for feeding the movable electrode to the arc; and means including a single electric motor responsive to a characteristic of the arc for simultaneously actuating said electrode moving and feeding means.

22. Electric arc welding apparatus comprising the combination of a mechanism including a centrifugal governor for moving an electrode to and from another electrode to maintain an arc established therebetween; a mechanism for feeding said movable electrode to the arc; and means including a single electric motor responsive to a characteristic of the arc for actuating both of said mechanisms.

23. Electric arc welding apparatus comprising the combination of two electrodes, at least one of which is movable; means for moving said movable electrode to and from said other electrode; means for feeding said movable electrode; means including a single motor for simultaneously actuating said electrode feeding and moving means to bring said movable electrode into contact with said other electrode; and means for rendering said motor inoperative upon the contacting of said electrodes to stop said electrode feeding means and to cause said moving means to retract said movable electrode from said other electrode to strike an arc therebetween and for rendering said motor operative after striking the arc to resume actuating said electrode feeding means and moving means to maintain and stabilize the arc.

24. Electric arc welding apparatus comprising the combination of a mechanism for moving an electrode to and from another electrode to establish and stabilize an arc therebetween; a mechanism for feeding the movable electrode to said other electrode; and a single motor connected to be responsive to an electrical characteristic of the arc and connected to both of said mechanisms for simultaneously actuating the same; said connection between said motor and said feeding mechanism including a variable speed change device for varying the rate of feeding of the movable electrode independently of the change of motor speed.

25. A welding machine comprising the combination of a mechanism for moving a welding wire to and from the work; a mechanism for feeding said welding wire to the work; a mechanism for relatively translating said welding wire and the work; and means including an electric motor connected to be responsive to changes in a condition of the weld for actuating said moving mechanism to regulate the position of the fusing end of the welding wire with respect to the work and for actuating said feeding mechanism to control the rate at which the welding wire is fed to the work and for actuating said translating mechanism to control the rate of relative movement of said welding wire and the work.

26. A welding machine comprising the combination of means for moving the fusing end of a welding wire with respect to the work; means for feeding the welding wire; means for relatively translating the wire and the work; a reversible motor connected to said above mentioned means to actuate the same when the wire is being translated in the progressive direction of a welding operation; and means for rendering said wire moving and feeding means inoperative when the welding wire is being translated in the direction opposite from that of the progressive direction of a welding operation.

27. A welding machine according to claim 26, including a switch for starting and stopping said motor, and means actuated by said translating means for actuating said switch to render said motor inoperative.

28. A welding machine comprising the combination of a frame; a carriage adapted to be moved along said frame; means for feeding welding wire to the work; means for moving the fusing end of the wire relatively to the work; said wire feeding and moving means being mounted on said carriage; a stationary motor; and means including gearing for connecting said motor to said carriage and said wire feeding and moving means to move said carriage along said frame and to actuate said wire feeding and moving means.

29. In a welding machine the combination of a frame; a carriage; means for moving the carriage along the frame; a welding head mounted on the carriage; means whereby said head is adjustable transversely of the direction of movement of said carriage; means including a centrifugal governor mounted on said carriage for moving the fusing end of welding wire to and from the work; and means on said head for feeding the welding wire to the work.

30. A welding machine, according to claim 29, in combination with mechanism for oscillating the welding wire transversely to the travel of the welding wire along the work.

31. In a welding machine, the combination of a welding head; means on said head for feeding welding wire to the work; and means including a governor and mechanism cooperating with the welding wire for automatically moving the fusing end thereof to and from the work.

32. A welding machine, according to claim 31, in which said mechanism comprises an arm carried by said welding head, the length of such arm being adjustable.

33. A welding machine comprising the combination of a frame; a carriage, means for moving the carriage along the frame; means for feeding welding wire to the work; means for automatically moving the fusing end of the wire to and from the work to regulate the position thereof with respect to the work; said wire feeding and moving means being mounted on said carriage; a single means for actuating said carriage moving means and said wire feeding and moving means;

and means for varying the rate of wire feeding independently of said last mentioned means.

34. In a welding machine, the combination of a frame; a carriage; means for moving the carriage along the frame; a welding head mounted on said carriage; means including an arm, the length of which is adjustable, for automatically moving the fusing end of the welding wire to and from the work to regulate the position thereof with respect to the work; means for feeding the welding wire to the work; said feeding means and said arm being carried by said welding head; and means whereby said welding head is adjustable transversely of the direction of movement of said carriage.

35. In an arc welding machine comprising the combination of an electric circuit including two electrodes, at least one of said electrodes being movable; a mechanism for moving said electrode to and from said other electrode to establish and stabilize an arc therebetween; a mechanism for feeding said movable electrode; a mechanism for relatively translating said electrodes; and means including a single motor connected to be responsive to an electrical condition in said circuit for actuating all of said mechanisms.

36. In an arc welding machine in which an arc is arranged to be established between a movable electrode and the work, comprising the combination of a mechanism for moving the electrode to and from the work to strike and stabilize the arc therebetween; a mechanism for feeding the electrode; a mechanism for translating the electrode; a reversible motor connected to be responsive to changes in an electrical characteristic of the arc; means for connecting said motor to all of said mechanisms to actuate the same when the electrode is being translated in the direction of progress of a welding operation; and means interposed in said connecting means for rendering said arc striking and stabilizing mechanism and said feeding mechanism inoperative when the electrode is being translated in the direction opposite from that of the progressive direction of a welding operation.

37. An arc welding machine according to claim 36, including a switch for starting and stopping said motor, and means including a member actuated by said translating mechanism for actuating said switch to stop said motor.

38. An electric arc welding machine, in which an arc is arranged to be established between a movable electrode and the work, comprising the combination of a frame; a carriage mounted for movement on said frame; a mechanism for feeding the electrode; a mechanism for moving the electrode to and from the work to regulate the length of the arc; said electrode feeding and moving mechanisms being mounted on said carriage; a motor; and means including gearing for connecting said motor to said carriage and said mechanisms to drive said carriage and to actuate said mechanisms.

39. An electric arc welding machine in which an arc is arranged to be established between a movable electrode and the work, comprising the combination of a frame; a carriage; means for moving the carriage along the frame; a welding head mounted on the carriage; means whereby said head is adjustable transversely of the direction of movement of said carriage; means on said head for feeding the electrode to the arc; and means for automatically varying the position of the fusing end of the electrode to and from the work to regulate the position thereof with respect to the work.

40. An electric arc welding machine in which an arc is arranged to be established between a movable electrode and the work, comprising a frame; a carriage mounted for movement on said frame; means for moving the fusing end of the electrode to and from the work to regulate the length of the arc; means for feeding the electrode; said electrode feeding and moving means being mounted on said carriage; a motor; means for connecting said motor to said carriage and to said wire moving and feeding means to drive said carriage and to actuate said wire feeding and moving means; and means interposed between said motor and said electrode feeding means for varying the rate of electrode feeding independently of the speed of said motor.

41. An electric arc welding machine in which an arc is arranged to be established between a movable electrode and the work, comprising a frame; a carriage movable on said frame and including a welding head; means including an arm, the length of which is adjustable, for regulating the length of the arc; means for feeding the electrode to the arc; said feeding means and said arm being carried by said welding head; and means for moving said welding head laterally with respect to the direction of movement of said carriage.

42. A welding machine in which a welding wire is fed to the work, comprising a frame; a carriage movable on said frame and including a welding head; means including a telescopic quill having one end thereof fixed to said carriage and the opposite end thereof fixed to said welding head for allowing lateral movement of said welding head with respect to the direction of movement of said carriage; means carried by said welding head for feeding said welding wire to the work; a shaft extending through said quill and connected to said feeding means; and means for driving said shaft to actuate said feeding means.

43. In welding apparatus, means for feeding a welding wire, comprising the combination of two belts arranged adjacent each other adapted to grip and feed the welding wire between their coacting surfaces; said belts having a plurality of aligned grooves of different sizes to accommodate welding wires of different cross sectional areas; means automatically movable during the feeding of the welding wire for pressing the coacting surfaces of said belts toward each other to increase the gripping effect thereof on the welding wire; and means for driving the coacting surfaces of said belts in the same direction and at the same linear speed.

44. In welding apparatus, means for feeding a welding wire, comprising the combination of two belts arranged adjacent each other adapted to grip and feed the welding wire between their coacting surfaces; said belts having aligned longitudinal grooves to accommodate the wire being fed; means for yieldingly pressing the coacting surfaces of said belts toward each other to increase the gripping effect thereof on the welding wire; and means for driving the coacting surfaces of said belts in the same direction and at the same linear speed.

45. In welding apparatus, means for feeding a welding wire, comprising the combination of two endless belts arranged adjacent each other adapted to grip and feed the welding wire between their coacting surfaces; said belts having aligned longitudinal grooves to accommodate the wire being fed; means for yieldingly pressing the coacting surfaces of said belts toward each other to increase the gripping effect thereof on the welding wire; sheaves for said belts; said sheaves being grooved at their peripheries to receive the grooved portion in said belts, and means for driving said sheaves in opposite angular direction and at the same linear speed.

46. In an electric arc welding machine wherein current is conducted to a welding wire at the feeding means, the combination of two metallic belts arranged adjacent each other adapted to grip and feed the welding wire between their coacting surfaces, means for driving the coacting surfaces in the same direction and at the same linear speed, two members bearing against the backs of said belts, one or both of said members being connected to a source of current, at least one of said members being movable, and resilient means for yieldingly pressing said movable member toward said other member to make good electrical contact between said members, metallic belts, and the welding wire.

47. A welding machine comprising the combination of a carriage; means for feeding welding wire mounted on said carriage; a flexible member; means carried by said flexible member for guiding the welding wire from said feeding means lengthwise of said member to the work; and an arm having one end thereof connected to said carriage and the opposite end thereof connected to said flexible member for bending said flexible member and properly positioning the discharge end thereof with respect to the work.

48. In a welding machine, the combination of means for feeding welding wire; a pair of spaced flexible members; and means carried by said members for guiding the welding wire from such feeding means lengthwise of said members to the work; said guiding means comprising a plurality of adjacent rollers spaced apart along the length of said members and mounted thereon and having grooves at the peripheral surfaces thereof adapted to coact and accommodate the welding wire.

49. A welding machine according to claim 47, in which the guiding means comprises a plurality of adjacent rollers spaced apart along the length of said flexible member and mounted thereon, and means for regulating the spacing of adjacent rollers to accommodate different size welding wire.

50. A welding machine comprising the combination of a governor; means for guiding welding wire to the work; and connecting means between such guiding means and said governor whereby the latter is operative to vary the position of said guiding means relatively to the work.

51. A welding machine according to claim 50, in which said guiding means is flexible and said governor has a rotatable element which is adapted to vary the flexure of said guiding means.

52. A welding machine comprising the combination of a governor; means for guiding welding wire; means including a flexible shaft for connecting said governor to said guiding means; automatic means for operating said governor to move the discharge end of said guiding means to and from the work; and means for manually adjusting said shaft to move the discharge end of said guiding means to and from the work.

53. A welding machine comprising the combination of a governor; means for guiding welding wire to the work; means connecting such guiding means and said governor whereby the latter is operative to vary the position of the fusing end of the welding wire with respect to the work; and means for oscillating said guiding means transversely to the travel of the welding wire along the work.

54. In a welding machine wherein a means is provided for feeding a welding wire to the work; the combination of a flexible guiding means for guiding the wire from the feeding means to the work; a support; means including an arm having one end thereof pivotally secured to said support and the opposite end thereof connected to said flexible guiding means for supporting the same; and means for imparting an oscillatory motion to said arm and the lower end of said flexible guiding means.

55. Welding apparatus in which a movable welding wire is arranged to be fed toward the work, comprising the combination of means including a rotatable member for moving the fusing end of the welding wire to and from the work, means for feeding the wire to the work, and means responsive to changes in a condition of the weld for driving said rotatable member and for actuating said feeding means.

56. Electric arc welding apparatus comprising an electric circuit including a movable electrode and the work, such electrode and the work being arranged to have an arc established therebetween; means including a member adapted normally to be continuously rotating for moving said electrode to and from the work; means for feeding said electrode to the work; and means responsive to changes in an electrical condition in said circuit for varying the speed of rotation of said rotating member to regulate the position of the electrode with respect to the work and for actuating said feeding means to control the rate at which said electrode is fed to the work.

GEORGE T. SOUTHGATE.